US012654834B2

(12) United States Patent
Basta et al.

(10) Patent No.: US 12,654,834 B2
(45) Date of Patent: Jun. 16, 2026

(54) DEPLOYABLE LANDING GEAR SYSTEMS

(71) Applicant: World View Enterprises Inc., Tucson, AZ (US)

(72) Inventors: Timothy James Basta, Tucson, AZ (US); John Zaniel Maccagnano, Tucson, AZ (US)

(73) Assignee: World View Enterprises Inc., Tucson, AZ (US)

( * ) Notice: Subject to any disclaimer, the term of this patent is extended or adjusted under 35 U.S.C. 154(b) by 0 days.

(21) Appl. No.: 18/645,789

(22) Filed: Apr. 25, 2024

(65) Prior Publication Data

US 2024/0359788 A1     Oct. 31, 2024

Related U.S. Application Data

(60) Provisional application No. 63/499,100, filed on Apr. 28, 2023.

(51) Int. Cl.
B64B 1/00 (2006.01)
B64B 1/48 (2006.01)

(52) U.S. Cl.
CPC ............... B64B 1/005 (2013.01); B64B 1/48 (2013.01)

(58) Field of Classification Search
CPC ......... B64B 1/005; B64C 25/20; B64C 25/14; B64U 60/50
See application file for complete search history.

(56) References Cited

U.S. PATENT DOCUMENTS

| | | | |
|---|---|---|---|
| 2,336,203 A | 12/1943 | Warner | |
| 2,422,577 A | 6/1947 | Martin | |
| | (Continued) | | |

FOREIGN PATENT DOCUMENTS

| | | | |
|---|---|---|---|
| CN | 111792020 A | 10/2020 | |
| GB | 540776 A * | 10/1941 | ............. B64C 25/52 |
| | (Continued) | | |

OTHER PUBLICATIONS

Improvements in Telescopic Shock-absorbers (Year: 1941).*
(Continued)

*Primary Examiner* — Richard Green
*Assistant Examiner* — Nevena Aleksic
(74) *Attorney, Agent, or Firm* — Knobbe, Martens, Olson & Bear, LLP

(57) ABSTRACT

Deployable landing gear systems and related methods for vehicles descending from high altitude balloons. A deployable landing gear system may include a support assembly configured to deploy from an undeployed state to a deployed state. The landing support assembly may include a strut and two swing arms. The strut may include an outer cylinder, an inner cylinder, and a compression spring. The outer cylinder may have a compressible material positioned therein. The inner cylinder may be slidably disposed within the outer cylinder. The compression spring may be positioned around the outer cylinder between a fixed first bracket and a slidable second bracket. In response to deployment, the compression spring may compress between the first and second brackets and the inner cylinder may compress the compressible material. The two swing arms may share a common axis of rotation that is offset from the an axis of rotation of the strut.

11 Claims, 12 Drawing Sheets

(56) References Cited

U.S. PATENT DOCUMENTS

| | | | |
|---|---|---|---|
| 2,559,451 | A | 7/1951 | McBrearty |
| 3,635,183 | A | 1/1972 | Keatinge |
| 4,189,117 | A | 2/1980 | Masclet et al. |
| 4,328,939 | A | 5/1982 | Davies et al. |
| 4,345,727 | A | 8/1982 | Brown et al. |
| 4,422,602 | A | 12/1983 | Turiot |
| 5,022,609 | A | 6/1991 | Cranston |
| 6,227,494 | B1 * | 5/2001 | Turner .................. B64G 1/625 |
| | | | 244/172.6 |
| 7,273,195 | B1 | 9/2007 | Golliher |
| 9,540,091 | B1 | 1/2017 | MacCallum et al. |
| 9,658,618 | B1 | 5/2017 | Knoblach et al. |
| 9,694,910 | B2 | 7/2017 | MacCallum et al. |
| 9,868,537 | B2 | 1/2018 | Leidich et al. |
| 10,124,875 | B1 | 11/2018 | Farley et al. |
| 10,336,432 | B1 | 7/2019 | Farley et al. |
| 10,787,268 | B2 | 9/2020 | Leidich et al. |
| 10,988,227 | B2 | 4/2021 | MacCallum et al. |
| 11,584,515 | B2 | 2/2023 | Martin |
| 2017/0331177 | A1 | 11/2017 | MacCallum et al. |
| 2019/0202550 | A1 | 7/2019 | Evans et al. |
| 2021/0009276 | A1 | 1/2021 | Haynes et al. |
| 2021/0291968 | A1 | 9/2021 | Tischhauser |

FOREIGN PATENT DOCUMENTS

| | | |
|---|---|---|
| WO | WO 94/00343 A1 | 1/1994 |
| WO | WO 2013/060693 | 5/2013 |
| WO | WO 2024/226793 | 10/2024 |

OTHER PUBLICATIONS

International Preliminary Report on Patentability in International Application No. PCT/US24/26266, mailed Nov. 6, 2025.

International Search Report and Written Opinion in International Application No. PCT/US24/26266, mailed Aug. 21, 2024.

Etherington, D.: "World View's 'stratollites' and new spaceport aim to change the business of space", TechCrunch, posted Feb. 23, 2017, in 9 pages. URL: https://techcrunch.com/2017/02/23/world-views-stratollites-and-new-spaceport-aim-to-change-the-business-of-space/.

PR Newswire: "World View and Ball Aerospace Demonstrate Persistent Remote Sensing from Stratollite Platform", Yahoo Finance, posted Feb. 23, 2017, in 8 pages. URL: http://finance.yahoo.com/news/world-view-ball-aerospace-demonstrate-220000300.html.

World View: "The Stratollite", YouTube, published Feb. 23, 2017, video can be accessed at https://www.youtube.com/watch?v=GFdXBQPuznU (last accessed May 20, 2019).

* cited by examiner

DEPLOYABLE LANDING GEAR SYSTEMS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. For example, this application claims the benefit of U.S. Provisional Application No. 63/499,100, filed on Apr. 28, 2023, titled "DEPLOYABLE LANDING GEAR SYSTEMS", the entire content of which is incorporated by reference herein for all purposes and forms a part of this specification.

BACKGROUND

Field

The technology relates generally to deployable landing gear systems and related methods of deployment.

Description of the Related Art

Standard landing systems, for example for flying vehicles or platforms, use crushable cardboard that is sufficient for absorbing energy upon landing when the landing velocity is primarily vertical. However, the crushable cardboard may fail when the landing velocity is not primarily vertical, for example when the landing velocity has a significant horizontal component that results in a horizontal energy component upon landing. There is a need for landing gear systems that account for both vertical and horizontal energy upon landing.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices and methods for deployable landing gear systems.

The following disclosure describes non-limiting examples of some embodiments. For instance, other embodiments of the disclosed systems and methods may or may not include the features described herein. Moreover, disclosed advantages and benefits may apply only to certain embodiments of the invention and should not be used to limit the disclosure.

In one aspect, a deployable landing gear system includes a payload support and at least one landing support assembly coupled to the payload support. The payload support is configured to support a payload. The at least one landing support assembly is configured to deploy to transition from an undeployed state to a deployed state. The at least one landing support assembly includes a strut and two swing arms. The strut includes a hollow outer cylinder having a compressible material positioned therein, an inner cylinder slidably disposed within the hollow outer cylinder, and a compression spring positioned around the hollow outer cylinder between a first bracket fixed to the hollow outer cylinder and a second bracket slidably disposed over the hollow outer cylinder. In response to deployment of the at least one landing support assembly, the compression spring is configured to compress between the first bracket and the second bracket. The inner cylinder is configured to compress the compressible material in response to a vertical force acting on the at least one landing support assembly. The two swing arms are each coupled at a first end to the payload support and at a second end to a common vertex. The two swing arms share a common axis of rotation that is offset from an axis of rotation of the strut.

Various embodiments of the various aspects may be implemented. In some embodiments, the system includes a retaining mechanism configured to assist in holding the at least one landing support assembly in the undeployed state. In some embodiments, the system includes a pyro-cutter configured to deploy the at least one landing support assembly by cutting a cable of the retaining mechanism. In some embodiments, the system includes a kick-off spring configured to apply an outward force to the strut to assist in deploying the at least one landing support assembly. In some embodiments, the at least one landing support assembly further includes a landing ski, the landing ski coupled to an end of the strut and two swing arms. In some embodiments, the strut includes a first portion and a second portion, the first portion coupled to the second portion via a locking mechanism wherein the locking mechanism is configured to lock the strut in the deployed state after deployment. In some embodiments, the compressible material is a honeycomb aluminum. In some embodiments, the strut further includes a third bracket fixed to the inner cylinder and a tension line extending from the third bracket to the second bracket, the tension line configured to assist with movement of the inner cylinder. In some embodiments, a position of the second bracket is fixed relative to the inner cylinder. In some embodiments, the inner cylinder is configured to translate outwardly and away from the hollow outer cylinder to an extended state in response to deployment of the at least one landing support assembly. In some embodiments, the inner cylinder is configured to translate towards and into the hollow outer cylinder to a retracted state in response to the vertical force acting on the at least one landing support assembly.

In another aspect, a method of landing a flight vehicle using a landing gear system includes prior to landing, deploying at least one landing support assembly coupled to an exoskeleton, the at least one landing support assembly each including a strut and two swing arms. The strut includes a hollow outer cylinder, an inner cylinder, and a compression spring. The hollow outer cylinder has a compressible material positioned therein. The inner cylinder is slidably disposed within the hollow outer cylinder. The compression spring is positioned around the hollow outer cylinder between a first bracket fixed to the outer cylinder and a second bracket slidably disposed over the hollow outer cylinder. Deploying the at least one landing support assembly causes the compression spring to compress between the first bracket and the second bracket. The method also includes landing the flight vehicle so that the inner cylinder retracts into the hollow outer cylinder to compress a compressible material disposed within the hollow outer cylinder.

Various embodiments of the various aspects may be implemented. In some embodiments, deploying the at least one landing support assembly includes cutting a retaining mechanism configured to retain the at least one landing support assembly in a stowed position with a pyro-cutter. In some embodiments, deploying the at least one landing support assembly causes the two swing arms to rotate about a common axis of rotation that is different than an axis of rotation of the strut. In some embodiments, deploying the at least one landing support assembly includes locking a locking mechanism disposed between a first portion of the strut and a second portion of the strut. In some embodiments, the at least one landing support assembly includes a landing ski coupled to an end of the strut and two swing arms. In some embodiments, the strut includes a third bracket fixed to the inner cylinder and a tension line extending from the third bracket to the second bracket. The tension line configured to assist with movement of the inner cylinder. In some embodiments, a position of the second bracket is fixed relative to the inner cylinder. In some embodiments, deploying the at least one landing support assembly causes the inner cylinder to translate outwardly and away from the hollow outer cylinder to an extended state. In some embodiments, landing the flight vehicle causes the inner cylinder to translate towards and into the hollow outer cylinder to a retracted state.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawing, may be arranged, substituted, combined, and designed in a wide variety of different configurations, all of which are explicitly contemplated and make part of this disclosure.

DETAILED DESCRIPTION

The following detailed description is directed to certain specific embodiments of the gasless strut landing systems, devices, and methods. In this description, reference is made to the drawings wherein like parts or steps may be designated with like numerals throughout for clarity. Reference in this specification to "one embodiment," "an embodiment," or "in some embodiments" means that a particular feature, structure, or characteristic described in connection with the embodiment is included in at least one embodiment of the invention. The appearances of the phrases "one embodiment," "an embodiment," or "in some embodiments" in various places in the specification are not necessarily all referring to the same embodiment, nor are separate or alternative embodiments necessarily mutually exclusive of other embodiments. Moreover, various features are described which may be exhibited by some embodiments and not by others. Similarly, various requirements are described which may be requirements for some embodiments but may not be requirements for other embodiments. Reference will now be made in detail to embodiments of the invention, examples of which are illustrated in the accompanying drawings. Wherever possible, the same reference numbers will be used throughout the drawings to refer to the same or like parts.

Example Flight Vehicle With Landing Gear System

Figure 1A:
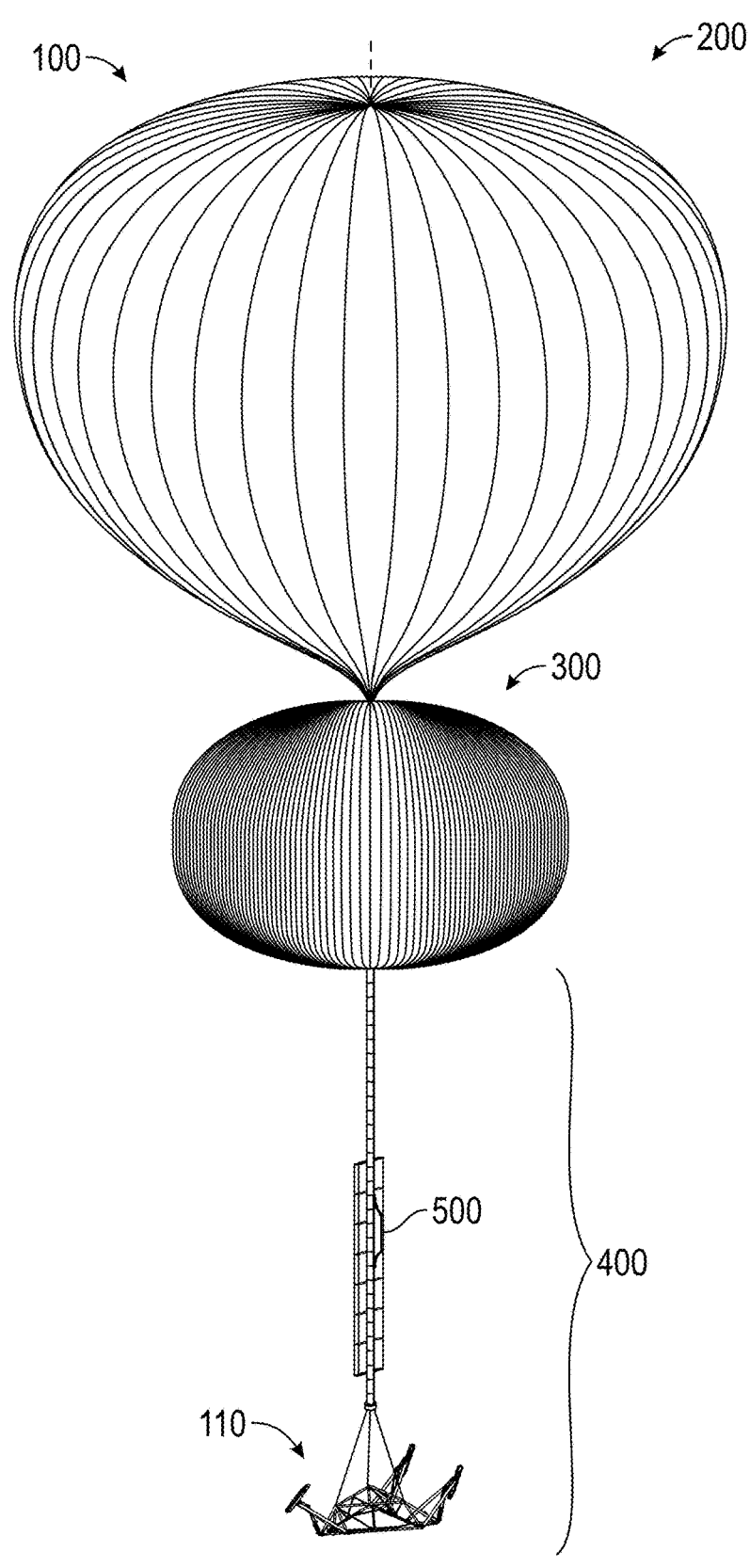
FIG. 1A is a top perspective view of an example flight vehicle having an embodiment of a landing gear system.

FIG. 1A is an example flight vehicle 100 in flight and having an embodiment of a landing gear system 110. The flight vehicle 100 may be used for high altitude flight. As used herein, "high altitude" refers to altitudes that are in the stratosphere (above 35,000 feet), and includes without limitation altitudes in the troposphere, the tropopause, and the stratosphere of Earth's atmosphere. In some embodiments, the flight vehicle 100 may be used at altitudes about 50,000 feet. The flight vehicle 100 includes a zero pressure balloon (ZPB) 200 attached above a super pressure balloon (SPB) 300, from which is suspended a stratocraft 400. The stratocraft 400 releasably supports a descent system 500, such as a parafoil, attached to the landing gear system 110. As further described, the landing gear system may include or be coupled to a payload support. The descent system 500 may detach from the flight vehicle 100 and descend to ground with the landing gear system 110 and, in some embodiments, a payload supported by the payload support.

The landing gear system 110 is used to absorb energy due to landing impact and thereby reduce loads transmitted to the payload and/or the flight vehicle 100, or portions thereof such as the descent system 500 upon impact with ground. The landing gear system 110 may be implemented with a variety of different flight vehicles and/or descent systems, such as parafoils, balloons, passenger capsules, spacecraft, and other vehicles. As shown in this example, a payload supported by the landing gear system 110 or a payload support coupled thereto may descend to ground from the flight vehicle 100 via the descent system 500 from a high altitude system comprising the ZPB 200 and SPB 300.

Many different flight vehicles may use the landing gear system 110. As shown, the flight vehicle 100 may be a lighter-than-air (LTA) flight vehicle. The flight vehicle 100 may include the ZPB 200 that provides lift and is attached in tandem with one or more variable air ballast SPB's 300. The ZPB 200 is a lifting balloon. The primary function of the ZPB 200 is to provide lift to the flight vehicle 100. An LTA gas is provided inside the ZPB 200 in an amount at launch sufficient for the LTA system 100 to take off. The ZPB 200 may be a "zero-pressure" type of balloon that contains an LTA gas therein for providing lift to the LTA system 100. The ZPB 200 may be filled with helium or hydrogen. A "zero-pressure balloon" is normally open to the atmosphere via hanging or attached ducts to prevent over-pressurization.

The SPB 300 provides a controlled and variable air ballast supply and emission (i.e., two-way ballast control) from ambient air in the surrounding atmosphere. A compressor, with sufficient air volume flow rate capabilities, may provide sufficient ambient air to the SPB 300 even at low densities in high altitudes for rapid descent or altitude maintenance. A controllable valve may be sized and controlled for sufficient air release from the SPB for rapid ascent or altitude maintenance. The primary function of such SPB 300 may thus be to provide a variable amount of ballast air to the LTA system 100. Ballast air may be taken into the SPB 300 in the form of compressed air to provide a greater downward force to the LTA system 100. Ballast may be ejected from the SPB 300 to provide a smaller downward force to the LTA system 100. In some embodiments, the LTA system 100 includes only one SPB 300. However, the LTA system 100 may include multiple SPB's 300, for example, two, three, four, or more SPB's 300. The SPB 300 may be a "super-pressure" type of balloon that is completely enclosed and operates at a positive internal pressure in comparison to the external atmosphere. Pressure control enables regulating the mass of air in the SPB 300, and therefore the overall buoyancy of the LTA system 100. This buoyancy regulation enables altitude control of the LTA system 100. The SPB 300 may take in more air to apply more of a ballast force, for example to descend, or to compensate for an expanding ZPB 200 that is producing more lift, as described. Conversely, the SPB 300 may release air to apply less of a ballast force, for example to ascend, or to compensate for a contracting ZPB 200 that is producing less lift. In some embodiments, the SPB 300 may include lifting gas, in addition to or alternatively to the ZPB 200. In some embodiments, other types of balloons besides ZPB's and SPB's may be used, either in addition or alternatively.

The SPB 300 supports the stratocraft 400. As shown, the stratocraft 400 is a structural system coupled under and with the SPB 300. In some embodiments, there are various intermediate structures and/or systems between the SPB 300 and the stratocraft 400, such as structural connectors, release mechanisms, other structures or systems, or combinations thereof. The stratocraft 400 includes one or more systems related to various mission objectives. The stratocraft 400 may include various subsystems, such as power, control, communications, air intake, air release, payload descent, etc., for supporting a mission. The stratocraft 400 may include or support the landing gear system 110.

The landing gear system 110 may provide structural support to a payload and/or other subsystems. The payload may be a variety of different systems, including but not limited to instruments, sensors, and/or passenger space capsules.

The landing gear system 110 may be releasably coupled with the stratocraft 400 or portion thereof. The landing gear system is attached during flight, such as to ladder ropes. The landing gear system 110 may be directly attached to a lifting balloon, such as the ZPB 200 or the SPB 300. The landing gear system 110 is then released for descent back to ground with the descent system 500 and payload.

Example Descent System With Decelerator System

Figure 1B:
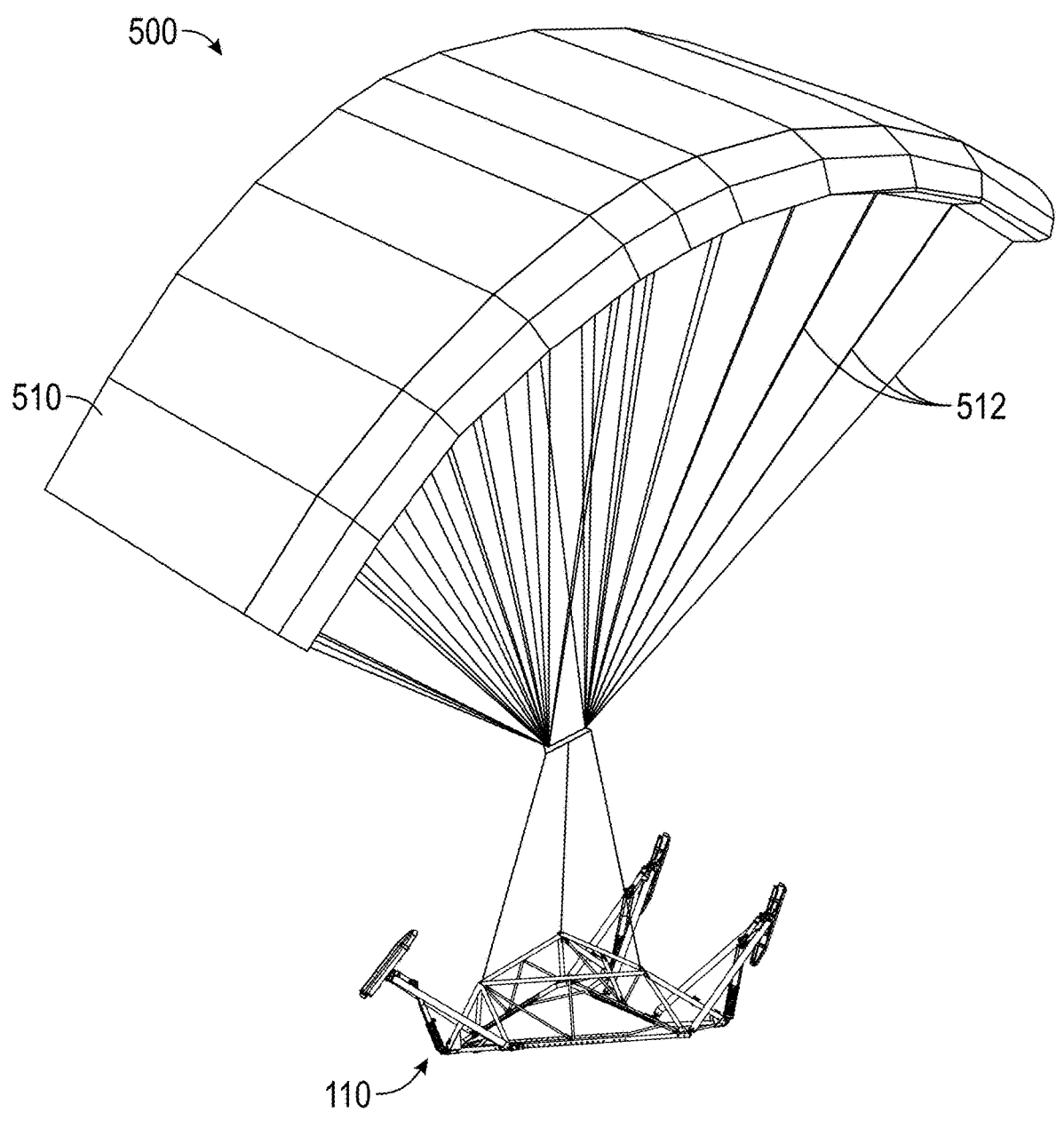
FIG. 1B is a top perspective view of a parafoil descent system of the flight vehicle of FIG. 1A in the separated and deployed configuration and having the landing gear system attached thereto.

As shown in FIG. 1B, the descent system 500, shown as a parafoil, is separated from the LTA system 100 and in a deployed flight configuration with the landing gear system 110.

The descent system 500 may separate from the flight vehicle 100 and deploy in the flight configuration to descend to ground with the landing gear system 110. In some embodiments, the descent system 500 may be configured to deploy into the flight configuration before separating from the rest of the flight vehicle 100. The descriptions of particular configurations of the descent system 500, and of particular deployment and flight procedures of the descent system 500, are not meant to limit the scope of the use of the landing gear system 110 and related methods to only those particular configurations, systems, and procedures explicitly described herein.

The descent system 500 may include a canopy 510, for example an at least partially soft structure that provides lift to the descent system 500. The canopy 510 may have more rigid features, such as stiffeners, local attachments, etc. The deployed canopy 510 is generally shaped like a bent wing, with a cross-sectional geometry approximating an airfoil shape. The descent system 500 may include one or more lines 512 that couple the canopy with the landing gear system 110.

The flight vehicle 100 with descent system 500 shown is merely one example vehicle that may use the landing gear system 110. Other embodiments of flight vehicles 100 may include only the ZPB 200, only the one or more SPB's 300, other descent systems besides or in addition to a parafoil, and/or other balloons or components. Other flight vehicles, descent systems, and components may use or incorporate the landing gear system 110, for example those described in U.S. Pat. No. 9,540,091, issued Jan. 10, 2017 and titled HIGH ALTITUDE BALLOON SYSTEMS AND METHODS, in U.S. Pat. No. 10,988,227, issued Apr. 27, 2021 and titled HIGH ALTITUDE BALLOON SYSTEMS AND METHODS USING CONTINUOUS MULTI-COMPARTMENT SUPER PRESSURE BALLOON, in U.S. Pat. No. 9,694,910, issued Jul. 4, 2017 and titled NEAR-SPACE OPERATION SYSTEMS, in U.S. Pat. No. 10,787,268, issued Sep. 29, 2020 and titled RIGIDIZED ASSISTED OPENING SYSTEM FOR HIGH ALTITUDE PARAFOILS, in U.S. Patent Pub. No. 2017/0331177, published Nov. 16, 2017 and titled HIGH ALTITUDE BALLOON ANTENNA SYSTEMS, in U.S. Pat. No. 9,868,537, issued Jan. 16, 2018 and titled RISER RELEASE FLARING SYSTEM FOR PARAFOILS, in U.S. Pat. No. 10,124,875, issued Nov. 13, 2018 and titled CONTINUOUS MULTI-CHAMBER SUPER PRESSURE BALLOON, and in U.S. Pat. No. 10,336,432, issued Jul. 2, 2019 and titled LIGHTER THAN AIR BALLOON SYSTEMS AND METHODS, the entirety of each of which is hereby incorporated by reference and forms a part of this specification for all purposes.

Example Deployable Landing Gear System

Embodiments of the present disclosure relate generally to deployable landing gear systems. Deployable landing gear systems and related methods of deployment may be used with descent systems, such as parafoils, for descending payloads borne by high altitude flight systems, such as high altitude balloons. The deployable landing gear systems may include landing gear support assemblies that comprise a compressible material that assists in absorbing vertical energy and thereby reducing vertical forces on the descent system, payload, and/or other components a high altitude flight system during landing. The deployable landing gear systems may be reusable. In some embodiments, the landing gear systems may be reusable except for compressible material within the landing gear systems, which may be replaceable.

The landing gear support assemblies may include landing skis that allow the payload to slide along a landing surface along its path of travel (e.g., in a forward direction) during landing, which may assist in dissipating horizontal energy and therefore reducing horizontal forces on the descent system, payload, and/or other components a high altitude flight system during landing. The systems and methods according to the present disclosure may be advantageous in that the systems and methods may assist in absorbing both vertical and horizontal forces at the time of landing. Additionally, the landing gear systems 110 described herein provide for a lightweight solution to absorb energy of a high altitude payload during landing under a parafoil parachute.

Figure 2:
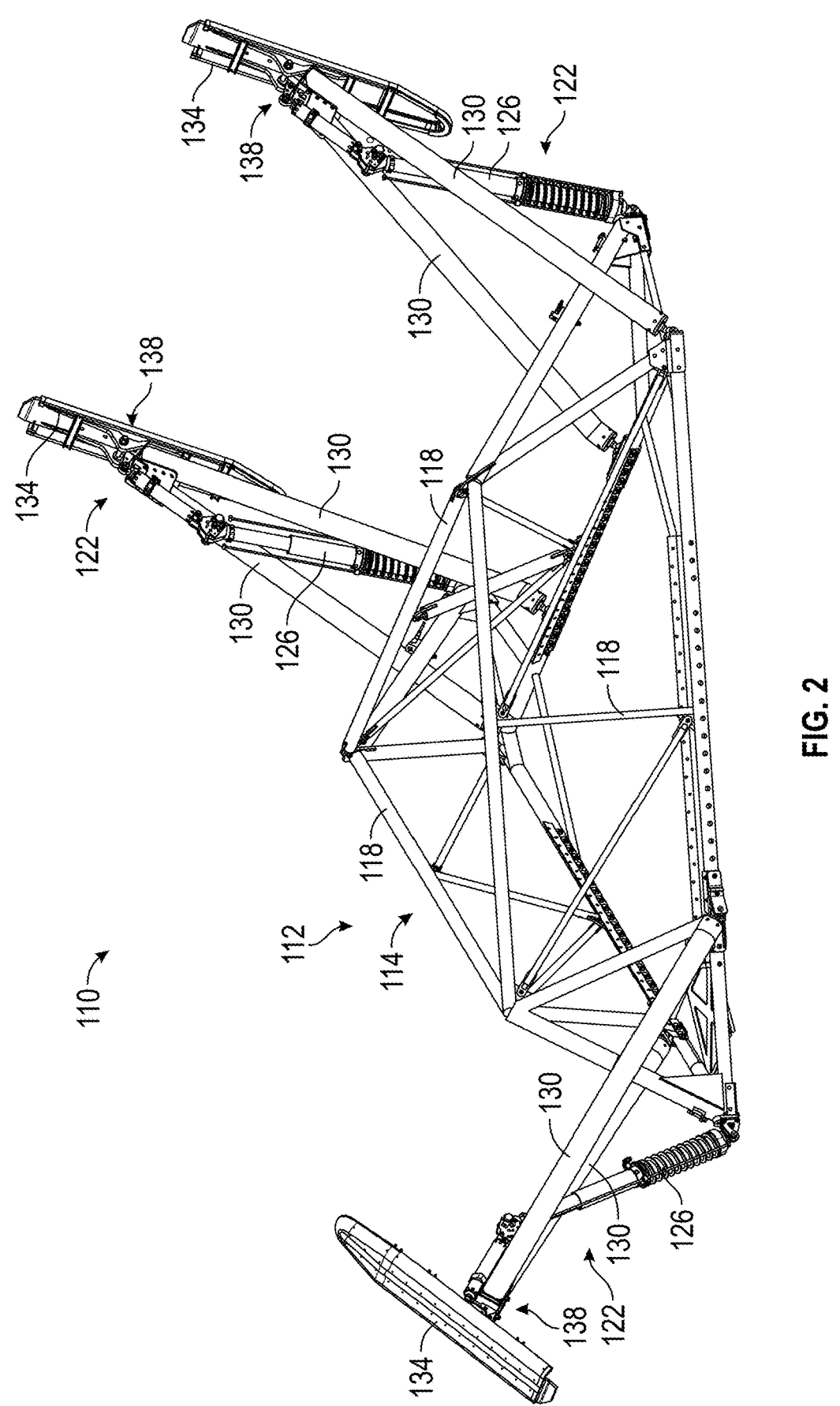
FIG. 2 is a perspective view the landing gear system depicting three landing support assemblies in a stowed or undeployed state.
Figure 3:
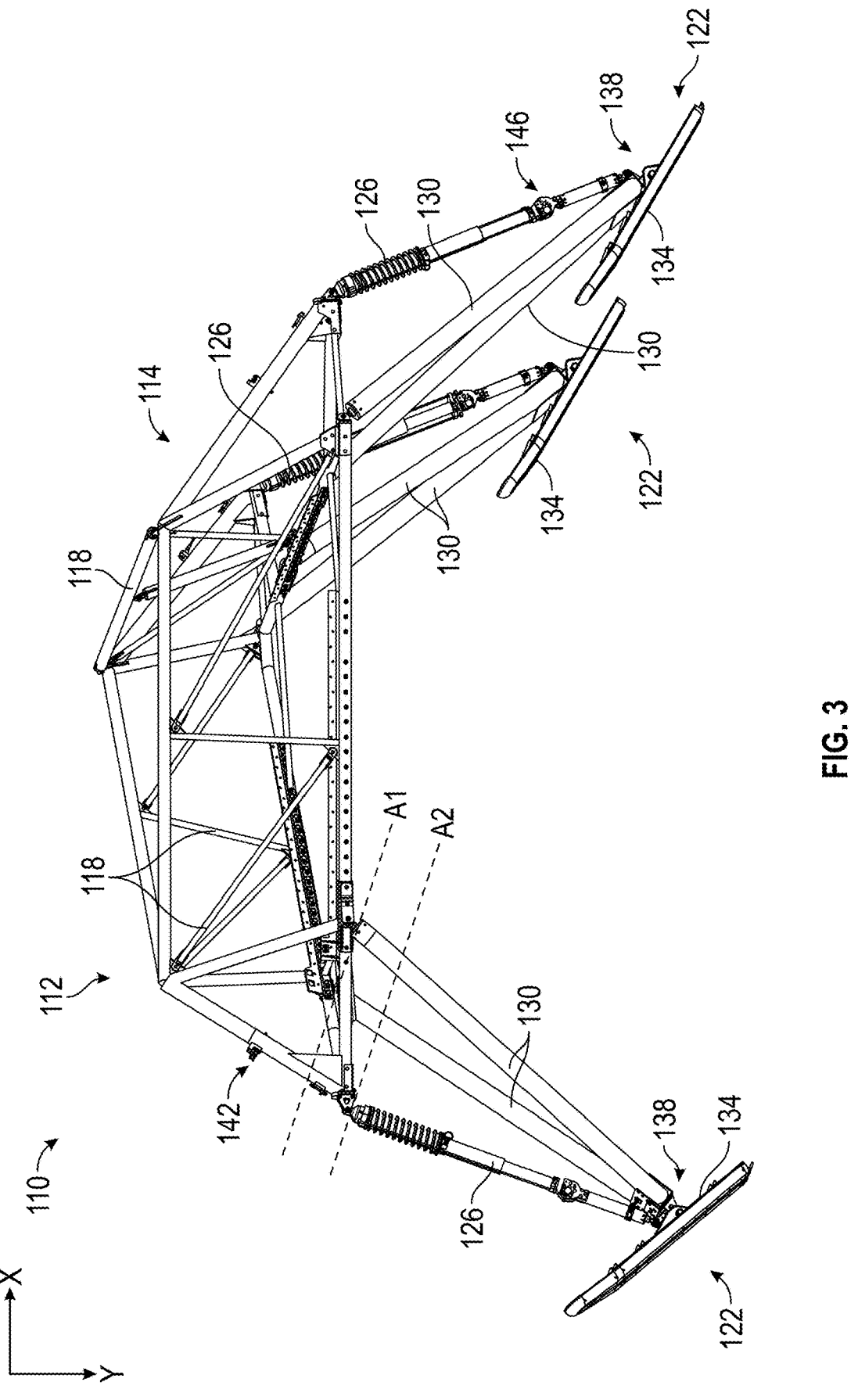
FIG. 3 is a perspective view of the landing gear system of FIG. 2 in a deployed state.

FIG. 2 is a perspective view of an example landing gear system 110 in a stowed or undeployed state. FIG. 3 is a perspective view of the landing gear system 110 in a deployed state. The landing gear system 110 may include a payload support 112. The payload support 112 may be formed by an exoskeleton 114. The exoskeleton 114 may include a plurality of structural members 118. The structural members 118 may be positioned such that the structural members 118 at least partially surround a payload (not shown). The structural members 118 at least partially surrounding the payload may protect and/or secure the payload to the landing gear system 110.

The structural members 118 may be arranged to form an exoskeleton 114 of a predetermined or desired shape. The shape of the exoskeleton 114 may be determined in part by the shape of the payload. While the exoskeleton 114 shown would surround and support the bottom and sides of a payload shaped as a tetrahedron, any shape may be formed, for example, triangular, square, rectangular, or polygonal. The structural members 118 may be tube shaped and of varying lengths. The lengths of the structural members 118 may depend on the predetermined shape that is formed to surround and support the payload. One or more structural members 118 may be positioned generally parallel to a first plane. One or more structural members 118 may be positioned generally parallel to a second plane that is generally perpendicular to the first plane. One or more structural member 118 may be positioned at an angle relative to the first and/or second planes.

Each structural member 118 may be connected to one or more other structural members 118. In some embodiments, two or more structural members 118 may be coupled at a common vertex. In some embodiments, one or more structural members 118 may be coupled at a first end to a location generally central along the length of a first structural member 118 and at a second end to a location generally central along the length of a second structural member 118. In some embodiments, the structural members 118 may be coupled and arranged such that the structural members 118 form an exoskeleton 114 having corners.

Figure 2A:
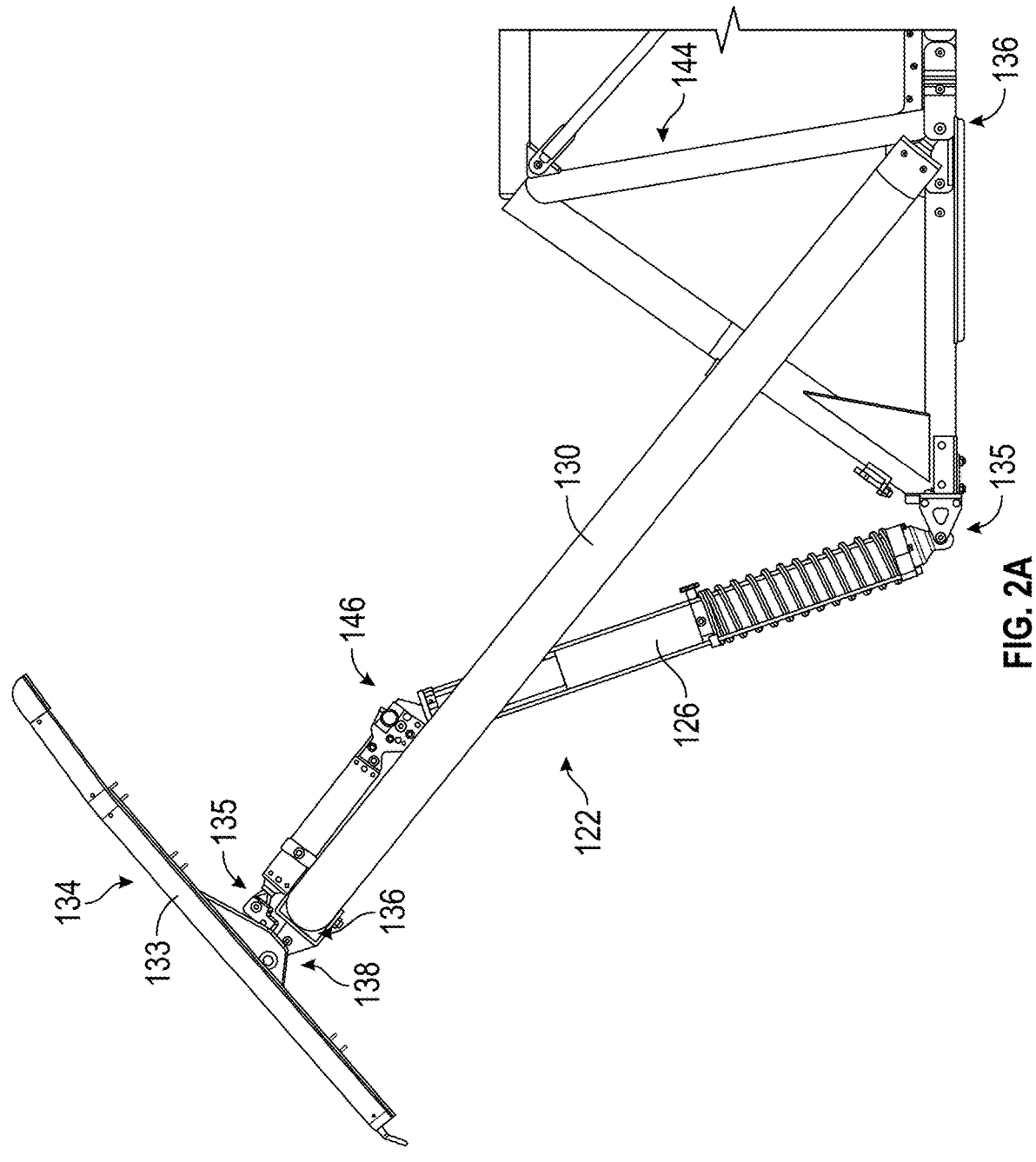
FIG. 2A is a closeup side view of one of the landing support assemblies of FIG. 2 in a stowed or undeployed state.
Figure 3A:
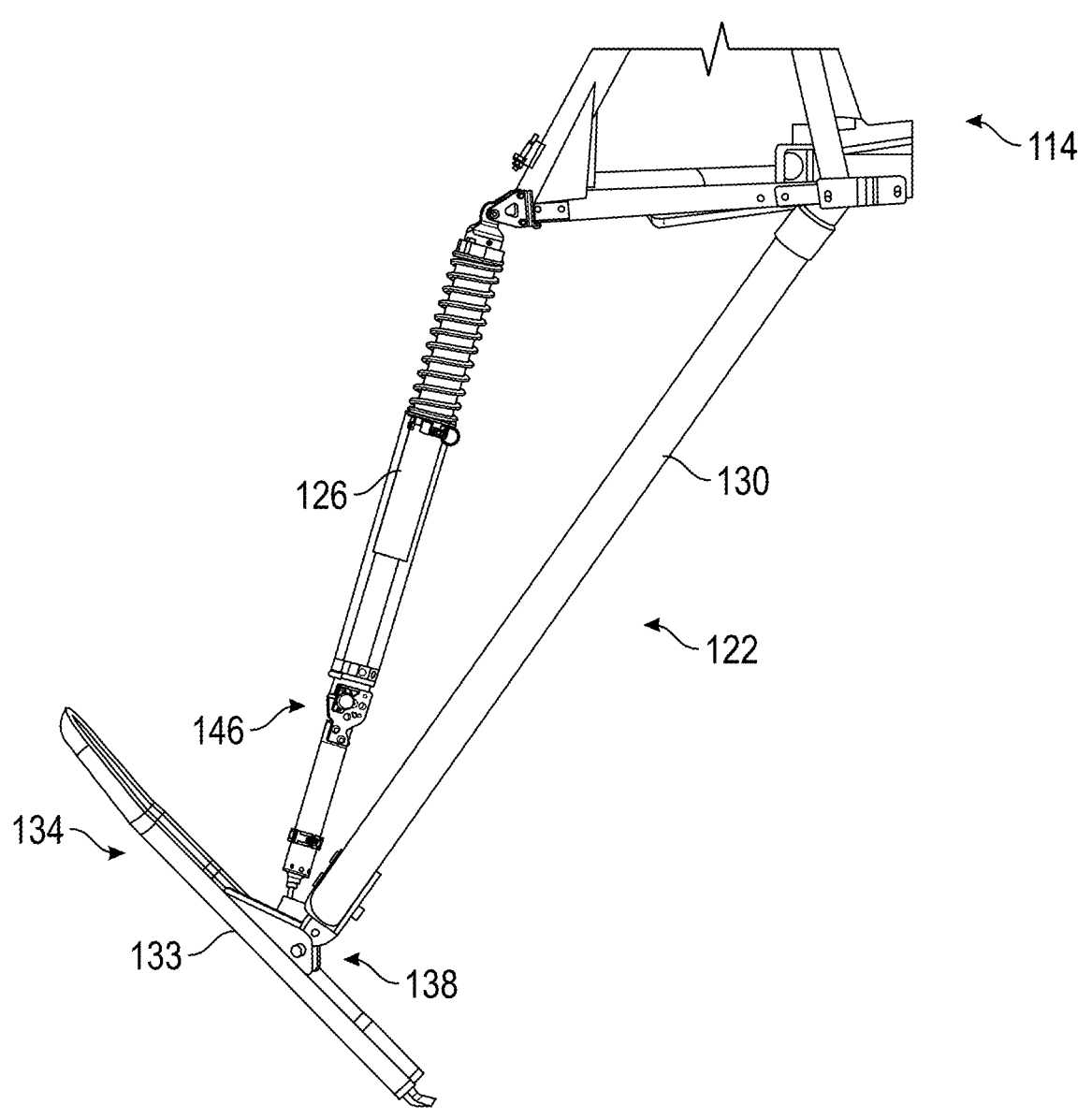
FIG. 3A is a closeup side view of one of the landing support assemblies of FIG. 3 in a deployed state.

The landing gear system 110 may include one or more landing support assemblies 122. While three landing support assemblies 122 are shown in FIGS. 2 and 3, any number may be used, for example, one, two, four, five, or more landing support assemblies. The landing support assemblies 122 may be coupled to the exoskeleton 114. Depending on the shape of the exoskeleton 114, the landing support assemblies 122 can be circumferentially spaced about an outer perimeter of the exoskeleton 114 and/or positioned at or near corners of the exoskeleton 114. The landing support assemblies 122 can be configured to transition between a stowed or undeployed position (e.g., as shown in FIG. 2A) and a deployed position (e.g., as shown in FIG. 3A). The exoskeleton 114 may be stronger than the landing support assemblies 122, so that failure of the landing support assemblies 122 may occur before failure of the exoskeleton 114. The landing gear system 110 may support a payload of up to 800 lbs. The system 110 may operate in a vacuum and at −90 degrees Celsius to survive high altitudes and be deployable at high altitudes, such as up to 90,000 feet.

Each landing support assembly 122 may include a strut arm 126 (discussed in more detail with reference to FIGS. 7A-9B) and two swing arms 130. The strut arm 126 may be coupled at a first end to the exoskeleton 114 and at a second end to a landing ski 134. The strut arm 126 may be coupled to the exoskeleton 114 and/or the landing ski 134 via pinned joints 135 (as labeled in FIG. 2A) that allow for rotation. Each swing arm 130 may be coupled at a first end to the exoskeleton 114 and at a second end to the landing ski 134. The swing arms 130 may be coupled to the exoskeleton 114 and/or the landing ski 134 via pinned joints 136 (as labeled in FIG. 2A) that allow for rotation. The second end of the strut arm 126 and the second ends of the swing arms 130 may meet at a common vertex 138 on the landing ski 134. The two swing arms 130 may share a common axis of rotation A1, as shown in FIG. 3. The axis of rotation A1 may be offset from an axis of rotation A2 of the strut arm 126, as shown in FIG. 3. The offset nature of the axis of rotation A1 and A2 may prevent the strut arm 126 and the swing arms 130 from returning to the undeployed or stowed state after deployment of the strut arm 126, as described in further detail herein. In some embodiments, the offset nature of the axis of rotation of A1 and A2 may allow the strut arm 126 and/or the swing arms 130 to be stowed above a flat plane of a payload deck of the exoskeleton 114 allowing for a full 180 degree field of regard for the payload. The knee locking mechanism 146 described herein, may also assist in stowing the strut arm 126 and/or the swing arms 130 to be stowed above a flat plane of a payload deck of the exoskeleton 114 allowing for a full 180 degree field of regard for the payload. The field of regard refers to the angles of unobstructed view provided to an attached payload by the flight vehicle 100. The strut arm 126 may be able to operate at a g-force of 5 g's or up to 5 g's, for example, up to or at 1 g, up to or at 2 g's, up to or at 3 g's, up to or at 4 g's, up to or at 5 g's, and any value in between. The strut arm 126 may be able to operate at landing speeds of up to or at about 20 mph horizontally and landing speeds of up to or at about 12 mph vertically. The vertical direction may be represented by the Y-axis and the horizontal direction may be represented by the X-axis, as shown in FIG. 3. For example, about 5 mph horizontally, about 10 mph horizontally, about 15 mph horizontally, about 20 mph horizontally, and any value in between. For example, about 2 mph vertically, about 4 mph vertically, about 6 mph vertically, about 8 mph vertically, about 10 mph vertically, about 12 mph vertically and any value in between.

The landing ski 134 may have an elongate length with rounded edges 133, as shown in FIGS. 2A and 3A. The elongate length and rounded edges may allow the landing ski 134 to slide along a direction of travel of the descent system (e.g., forward) during landing. The rounded edges of the landing skis 134 can prevent the landing skis 134 from digging into the landing surface (e.g., the ground) or snagging on the landing surface during landing. The landing ski 134 may be rotatably coupled to the strut arm 126 and swing arms 130. The landing ski 132 may be coupled to the strut arm 126 and swing arms 130 at or near a generally central location along the length of the landing ski 134. The landing ski 134 may be able to rotate to account for the angle at which landing occurs. For example, when landing, the landing ski 134 can rotate as needed to account for the horizontal and vertical components of the motion of the descent system and/or payload. The landing ski 134 may rotate as needed once a portion of the landing ski 134 comes into contact with the landing surface. The landing ski 134 may assist in absorbing both horizontal and vertical forces at the time of landing. For example, the sliding of the landing ski 134 may dissipate the horizontal energy on landing.

With reference to FIGS. 2 and 2A, when in an undeployed or stowed state, the landing support assemblies 122 may be positioned such that they are raised above a bottom (e.g., a bottom plane) of the exoskeleton 114. The positioning of the landing support assemblies 122 in a undeployed state may prevent or limit the landing support assemblies 122 from protruding or extending beneath a lower portion of the exoskeleton 114. The landing support assemblies 122 being positioned above the lower portion of the exoskeleton 114 may allow for the use of high volume payloads, such as radars that require extended space to rotate/sweep. The strut arm 126 may be in a bent configured as discussed in more detail below. The strut arm 126 and the swing arms 130 may be secured to exoskeleton 114 by a retaining mechanism 142, as shown in FIG. 5, when in the undeployed state.

With reference to FIGS. 3 and 3A, when in a deployed state, the landing support assemblies 122 may be positioned below the lower portion of the exoskeleton 114 such that the protrude or extend beneath the lower portion. The strut arm 126 may be in a straightened configured as discussed in more detail below. The landing support assemblies 122 extending beneath the exoskeleton 114 may ensure that the landing support assemblies 122 contact the landing surface and prevent the exoskeleton 114 from contacting the landing surface.

Figure 4A:
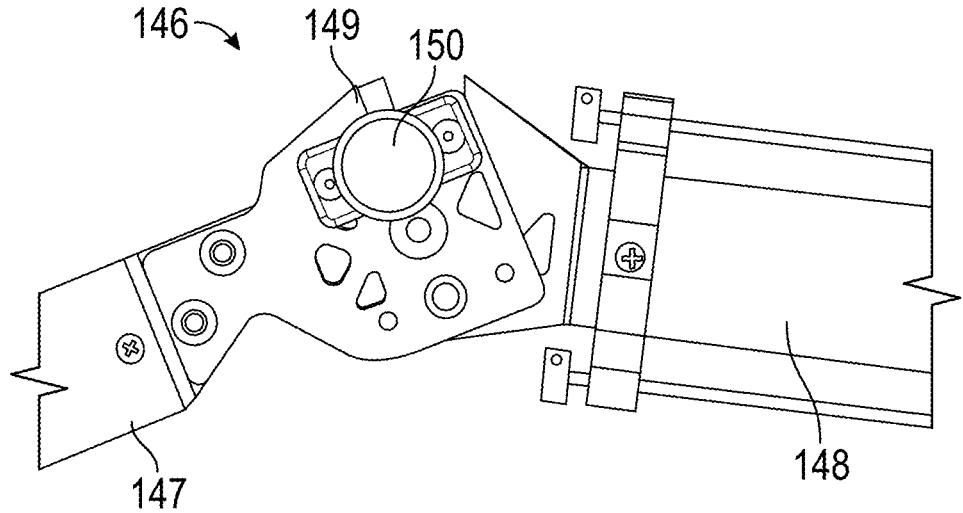
FIG. 4A is a side view of a knee locking mechanism of the of the landing gear system of FIG. 2 in a stowed state.
Figure 4B:
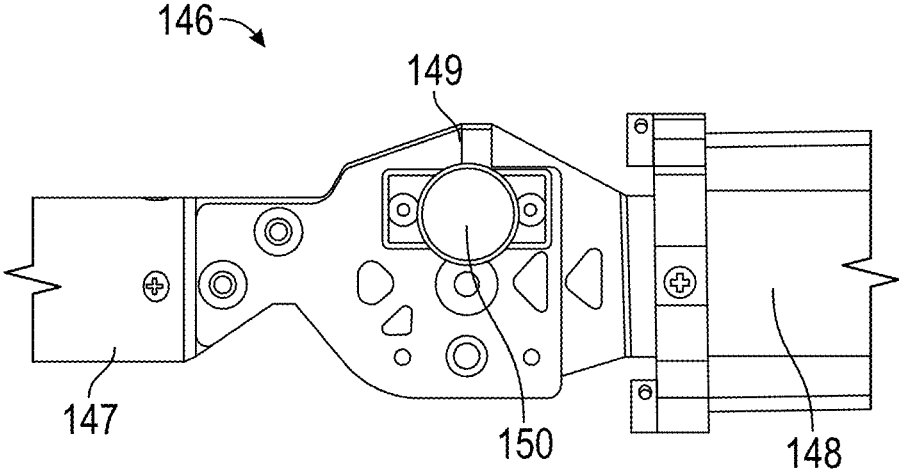
FIG. 4B is a side view of the knee locking mechanism of FIG. 4A in a deployed state.

The strut arm 126 may include a knee locking mechanism 146. FIG. 4A is a side view of the knee locking mechanism 146 in an undeployed state and FIG. 4B is a side view of the knee locking mechanism 146 in a deployed state. The knee locking mechanism 146 may be a locking knee joint, as shown in FIGS. 4A-4B. The knee locking mechanism 146 can couple a first portion 147 and a second portion 148 of the strut arm 126. The first portion 147 can be coupled at a first end to the landing ski 134 and at a second end to the knee locking mechanism 146. The second portion 148 can be coupled at a first end to the knee locking mechanism 146 and at a second end to the exoskeleton 114. The knee locking mechanism 146 can be configured to allow the strut arm 126 to bend and straighten. When in the undeployed or stowed state, the strut arm 126 may be bent, for example as shown in FIG. 2A. When in a deployed state, the strut arm 126 may be straightened, for example as shown in FIG. 3A. By allowing the strut arm 126 to transition between the bent stowed configuration and the straight deployed configuration, the knee locking mechanism 146 allows the landing support assemblies 122 to be stored along the sides of the landing gear system 110 above a bottom (e.g., a bottom plane) of the exoskeleton 114 (e.g., to provide an open area for payloads beneath the bottom of the exoskeleton 114). The knee locking mechanism 146 may include one or more spring pins 150. The spring pin 150 may automatically engage an opening or recess when the strut arm 126 transitions to a deployed state, for example straightens. The spring pin 150 may secure or lock the strut arm 126 in the straightened or deployed position. In some embodiments, the knee locking mechanism 146 may include a surface 149 configured to stop rotation of the first portion 147 relative to the second portion 148 and/or rotation of the second portion 148 relative of the first portion 147. This can prevent the strut arm 126 from extending past the straightened configuration to a new bent configuration. In some embodiments, the knee locking mechanism 1246 may fix a knee rotation joint in a 1.5 degree over-center position to prevent or reduce the one or more spring pins 150 from being added to the load path during landing. The knee locking mechanism 146 may be advantageous in that the knee locking mechanism 146 may allow the strut arm 126 to fall into place without active control prior to landing. Once the knee locking mechanism has reach a full extension, the knee locking mechanism 146 may lock the first portion 147 and the second portion 148 into a concentric position.

Figure 5:
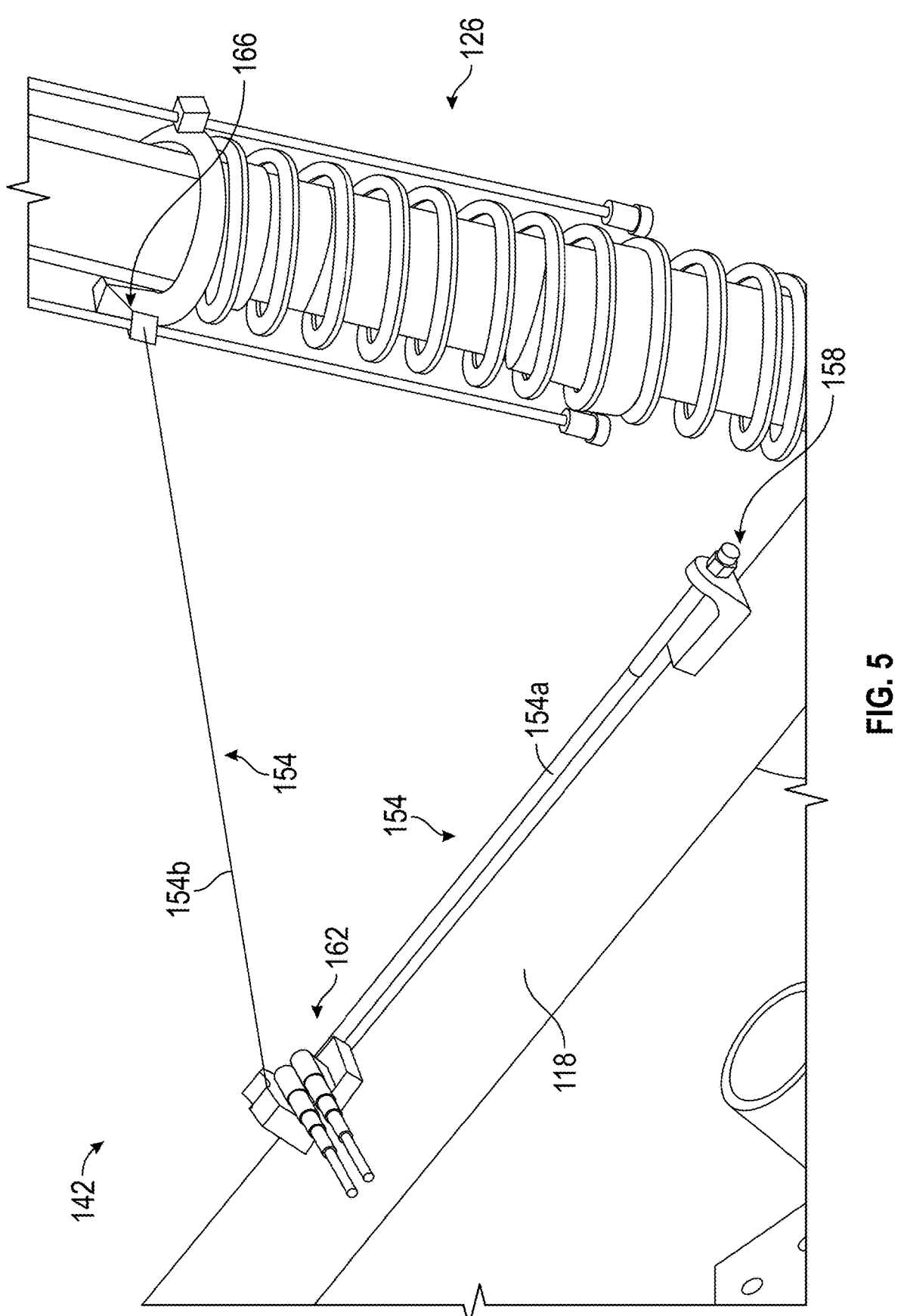
FIG. 5 is a closeup perspective view of a retaining mechanism for a strut arm and pair of swing arms of one of the landing support assemblies of FIG. 2.

FIG. 5 is a close up view of the retaining mechanism 142. The retaining mechanism 142 may assist in securing the strut arm 126 and the swing arms 130 in the stowed or undeployed position. The retaining mechanism 142 may couple the landing support assembly 122 via one or more of the strut arm 126 and swing arms 130 to the exoskeleton 114. The retaining mechanism 142 may include a wire or cable 154 (e.g., a pre-tensioned wire or cable) that assists in securing the landing support assembly 122 to the exoskeleton 114.

In some embodiments, the cable 154 may be coupled at a first end to a structural member 118 of the exoskeleton and at a second send to the strut arm 126, for example, as shown in FIG. 5. The cable 154 may be coupled at the first end to a tension screw 158 secured to the structural member 118. A first portion of the cable 154a may extend from the tension screw 158 to a cutting mechanism 162. The cutting mechanism 162 may be coupled to the structural member 118. In some embodiments, the cutting mechanism 162 may be a pyro-cutter. In some embodiments, the cutting mechanism 162 can be a plurality of pyro-cutters to provide deployment redundancy (e.g., two pyro-cutters, three pyro-cutters, or any other suitable number of pyro-cutters). The first portion of the cable 154a may extend generally parallel to the structural member 118. The first portion of the cable 154a may be positioned a distance away from an outer surface of the structural member 118 to prevent or limit the first portion of the cable 154a from coming into contact with the outer surface of the structural member 118. The cable 154 may extend through the cutting mechanism 162. A second portion of the cable 154b may extend from the cutting mechanism 162 to the strut arm 126. The second portion of the cable 154b can be coupled to the strut arm 126 by a pull-pin 166 that may be anchored or secured to the strut arm 126. The second portion of the cable 154b may extend at an angle relative to the structural member 118. As the cable 154 extends through the cutting mechanism 162 the direction or path of that the cable 154 extends may change. In some embodiments, the cable 154 may have a 4 mm Vectran 1474 kg load rating.

Figure 6:
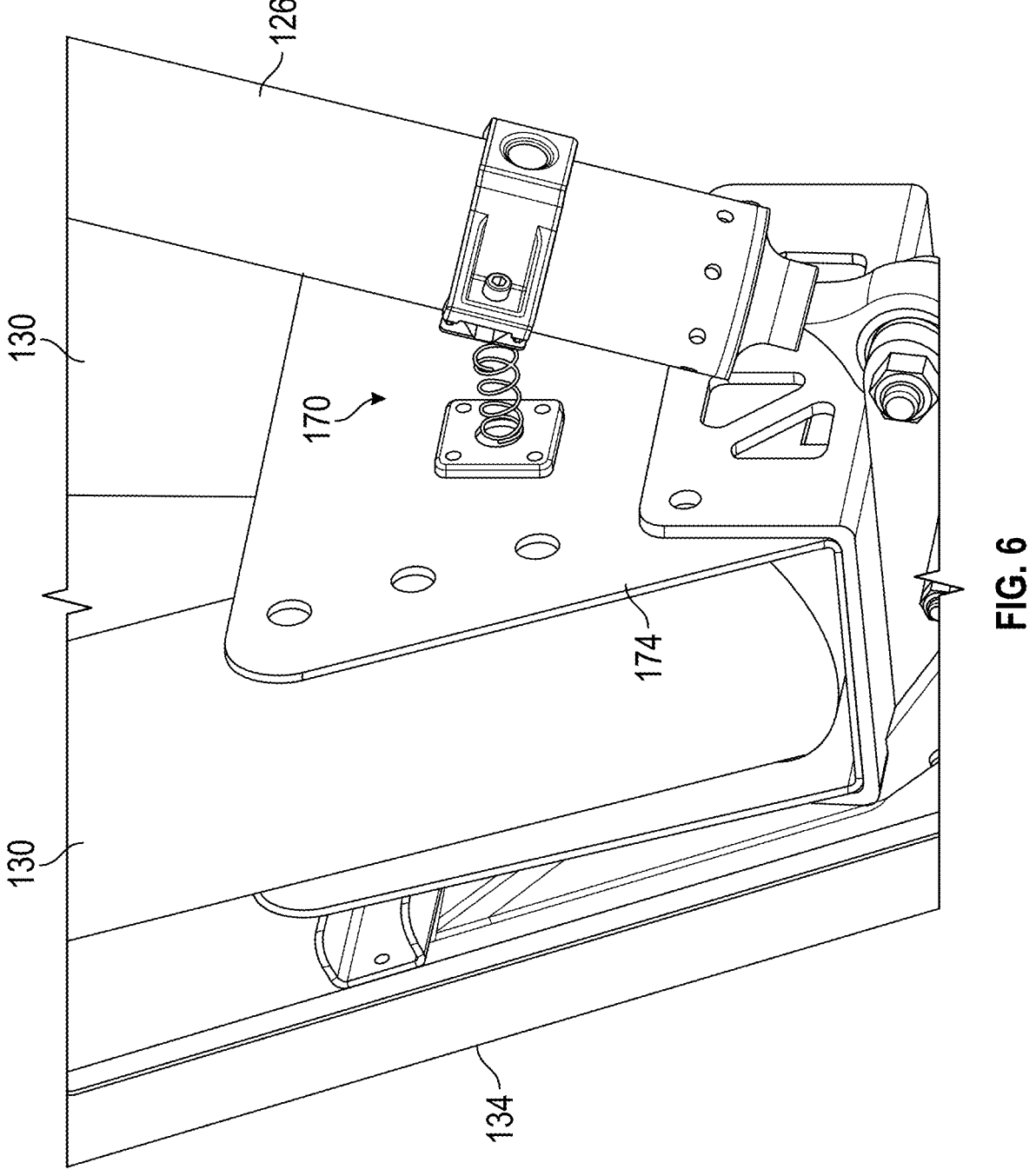
FIG. 6 is a perspective view of a kick-off spring of one of the landing support assemblies of FIG. 2.

FIG. 6 is a close up view of a kick-off spring 170 that may assist in deploying the landing support assembly 122. The kick-off spring 170 may be positioned between the strut arm 126 and a bracket 174. The bracket 174 may assist in coupled the swing arms 130 to the common vertex 138 where the swing arms 130 and the strut arm 126 may be rotatably coupled to the landing ski 134. When in a stowed or undeployed position, the kick-off spring 170 may be compressed between the strut arm 126 and the bracket 174. The kick-off spring 170 may be coupled at one end to either the strut arm 126 or the bracket 174. In some embodiments, the kick-off spring 170 may be coupled to both the strut arm 126 and the bracket 174. During deployment of the landing support assembly 122, the kick-off spring 170 may provide an outward force to assist in transitioning the strut arm 126 from an undeployed configuration (as shown in FIG. 2A) to a deployed or straight configuration (as shown in FIG. 3A). In some embodiments, the kick-off spring may provide a sufficient outward force to overcome static friction. While a spring is depicted any form of biasing member may be used.

When deploying the landing support assembly 122, the cutting mechanism 162 may cut the cable 154. The force of gravity may cause the strut arm 126 and the swing arms 130 of each landing support assembly 122 to rotate downward into the deployed configuration. In some embodiments, a combination of gravity and the kick-off spring 170 may cause the strut arm 126 and the swing arms 130 of each landing support assembly 122 to rotate downward into the deployed configuration. The knee locking mechanism 146 may then assist in securing the strut arm 126 in a deployed or straightened configuration according to the present disclosure. The cutting mechanism 162 may be initiated by a human operator in a mission control center. A command may be sent wirelessly to the flight vehicle 100. On receipt of the command, the cutting mechanism 162 may be activated and the cable 154 cut.

Figures 7A, 7B:
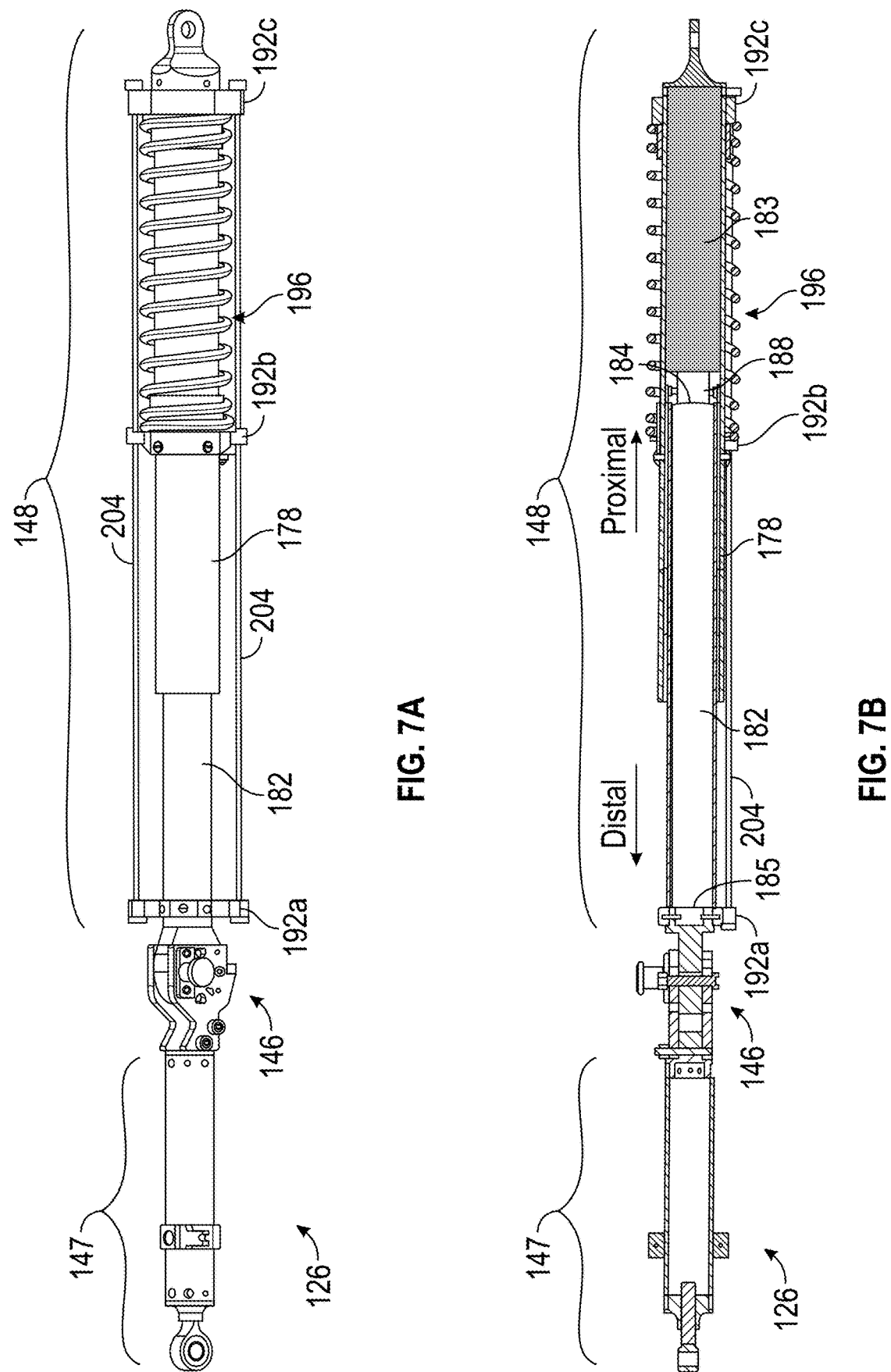
FIG. 7A is a sideview of a strut of the landing gear system of FIG. 2 in a stowed state.
FIG. 7B is a cross-sectional sideview of the strut of FIG. 7A.

FIGS. 7A and 7B are a side view and cross-sectional side view, respectively, of the strut arm 126 in an undeployed or stowed state. The strut arm 126 may operate without gas and may also be referred to herein as a gasless strut. As described herein, the strut arm 126 may include the first portion 147 and the second portion 148. The first portion 147 and the second portion 148 may be connected by the knee locking mechanism 146. The second portion 148 of the strut arm 126 may include a hollow outer cylinder 178 and an inner cylinder 182 disposed within the outer cylinder 178. In some embodiments, the inner cylinder 182 may be hollow. The inner cylinder 182 may be slidable within the outer cylinder 178. The sliding of the inner cylinder 182 within the outer cylinder 178 may adjust an overall length on the strut arm 126. A compressible material 183 may be positioned within the outer cylinder 178. In some embodiments, the compressible material 183 may be a honeycomb structure, for example, a honeycomb aluminum. In some embodiments, the compressible material 183 may be a corrugated paper energy absorbent material.

A proximal end 184 of the inner cylinder 182 may include or be coupled to a compression cup 188. A distal end 185 of the inner cylinder 182 may be opposite the proximal end 184. The compression cup 188 may have a solid end positioned adjacent or next to the compressible material 183. The compression cup 188 may be configured to compress the compressible material 183 upon impact at the time of landing. The use of gas is not need to assist in absorbing energy at the time of landing as the compression of the compressible material 183 may absorb the vertical landing forces. As described herein, upon landing, a force from the ground or landing surface is transmitted through the landing ski 134, to the knee locking mechanism 146, and to the inner cylinder 182. The inner cylinder 182 may then slide within the outer cylinder 178 and the solid end of the compression cup 188 may crush the compressible material 183, thereby absorbing at least some of the landing forces.

The strut arm 126 may include a plurality of linkage brackets 192. The linkage brackets 192 may be positioned along the length of the second portion 148 of the strut arm 126. Each linkage bracket 192 may extend around an outer perimeter of the strut arm 126. In some embodiments a first linkage bracket 192*a* may be fixed to the inner cylinder 182, a second linkage bracket 192*b* may be fixed to the outer cylinder 178 and a third linkage bracket 192*c* may be slidably disposed over the outer cylinder. The strut arm 126 may include a compression spring 196 positioned around the outer surface of the outer cylinder 178. The compression spring 196 may be positioned between the second linkage bracket 192*b* and the third linkage bracket 192*c*.

The strut arm 126 may include one or more tension lines 204. In some embodiments, the strut arm 126 may include two tension lines 204 positioned generally opposite each other. Each tension line 204 may extend from the first linkage bracket 192*a* to the third linkage bracket 192*c*. The tension line 204 may extend through the second linkage bracket 192*b*. The tension lines 204 may extend through openings of the linkage brackets 192*b*.

Figures 8A, 8B:
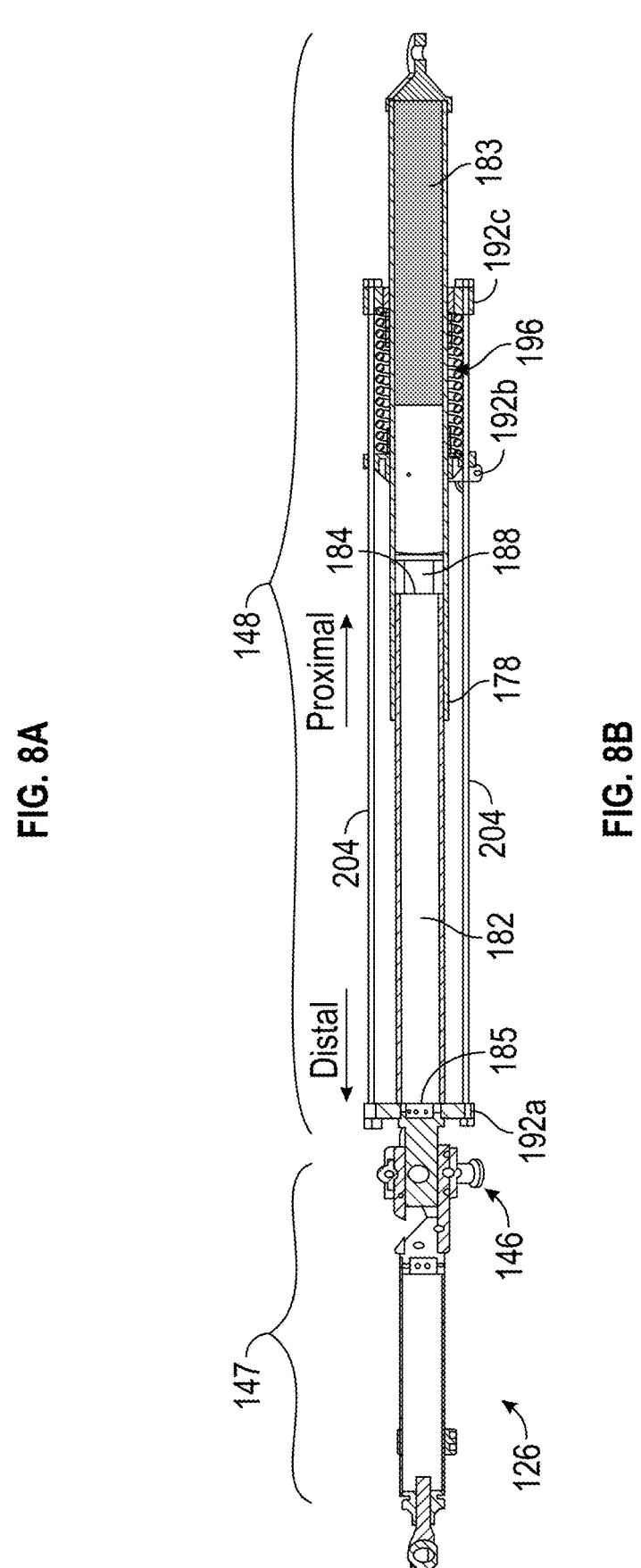
FIG. 8A is a sideview of the strut of FIG. 7A in a deployed state before landing.
FIG. 8B is a cross-sectional sideview of the strut of FIG. 8A.

FIGS. 8A and 8B are a side view and cross-sectional side view, respectively, of the strut arm 126 in a deployed state prior to landing. As each landing support assembly 122 is deployed, the swing arms 130 and the strut arms 126 may rotate and lock into place according to the present disclosure. The strut arm 126 may lengthen in the initial deployed state prior to landing relative to the stowed state. For example, as shown in FIGS. 8A and 8B, a shorter section of the inner cylinder 182 is positioned within the outer cylinder 178 and a longer section of the inner cylinder 182 is positioned outside the outer cylinder 178 so that the overall length of the second portion 148 and consequently the overall length of the strut arm 126 is greater than in the stowed configuration. When deployed, the momentum of the landing gear may cause the inner cylinder 182 to slide and/or translate outward and away from the outer cylinder 178 (e.g., in the distal direction as indicated in FIG. 8B) placing the inner cylinder 182 in an extended state. This may cause the first linkage bracket 192*a* to pull on the third linkage bracket 192*c*, via the tension lines 204, axially (e.g., in the distal direction). This may cause the compression spring 196 to compress between the second linkage bracket 192*b* and the third linkage bracket 192*c*, thus absorbing the shocks of landing gear deployment. For example, as shown in FIGS. 8A and 8B, the third linkage bracket 192*c* is no longer positioned at or near the proximal end of the outer cylinder 178 as shown in FIGS. 7A and 7B. Instead, the linkage bracket 192*c* is positioned distal relative to the end of the outer cylinder 178. The compression spring 196 may apply a biasing force outward on the third linkage bracket 192*c* to dampen the deployment and any resulting shocks to the system. The third linkage bracket 192*c* and compression spring 196 may help to mitigate the jarring effect that the deployment may have on the rest of the system.

Figures 9A, 9B:
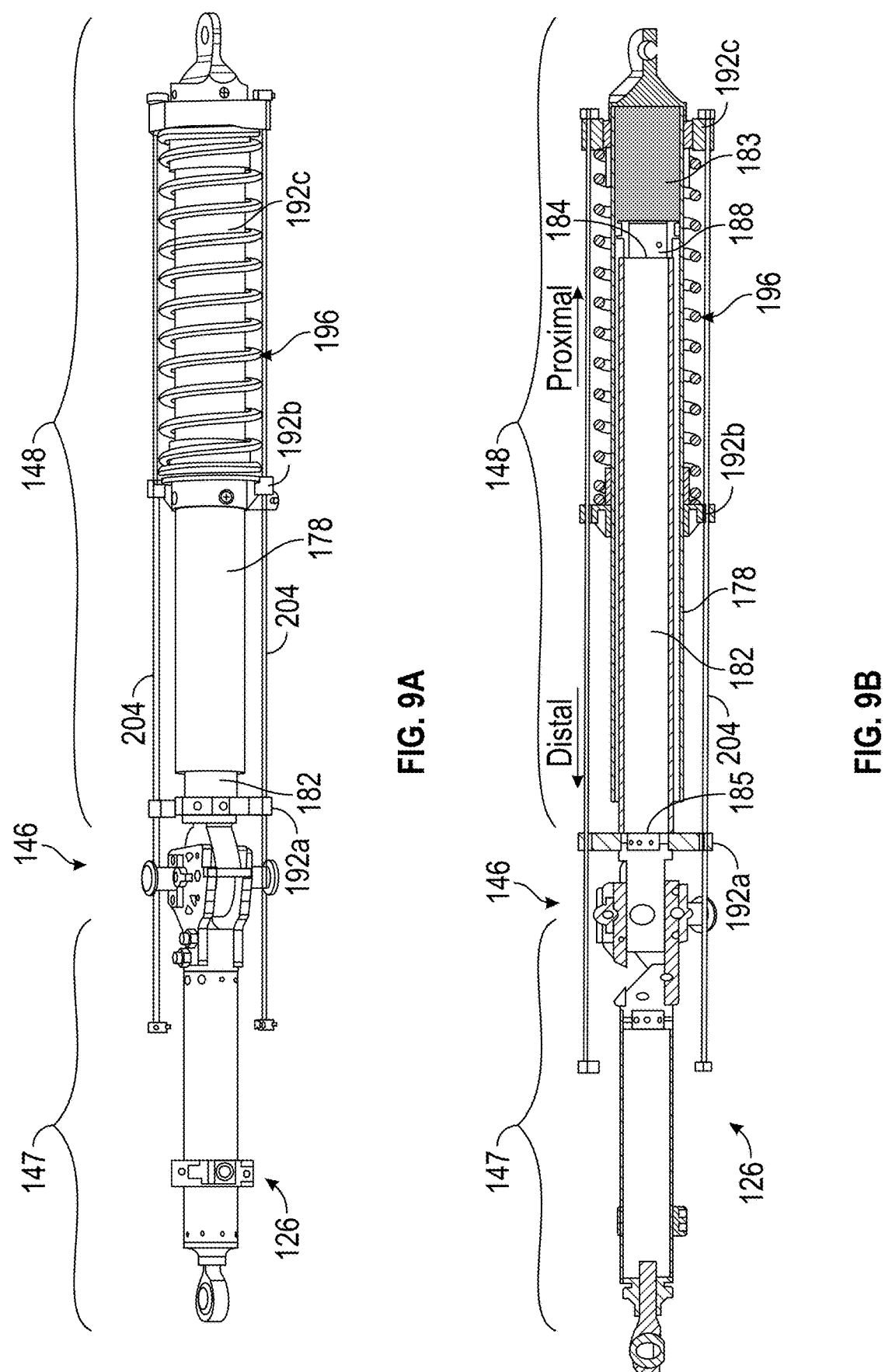
FIG. 9A is a sideview of the strut of FIG. 7A in a deployed state after landing.
FIG. 9B is a cross-sectional sideview of the strut of FIG. 9A.

FIGS. 9A and 9B are a side view and cross-sectional side view of the strut arm 126 in a deployed state after landing. As the system 110 lands on the ground, the impact of the landing may cause the inner cylinder 182 to move axially (e.g., in the proximal direction) into the outer cylinder 178 (e.g., retract within the outer cylinder 178) placing the inner cylinder 182 in a retracted state. The compression spring 196 may expand or return to an initial state (e.g., not compressed or elongated) which may cause the third linkage bracket 192c to slide toward the proximal end of the strut arm 126. The compression cup 188 may at least partially crush the compressible material 183 as the inner cylinder 182 retracts into the outer cylinder 178. This in turn softens the landing and reduces the impact according to the present disclosure. The tension lines 204 may translate through the linkage brackets 192b as the compressible material 183 is compressed or crushed. The tension lines 204 may include a cap that prevents them from passing through the linkage brackets 192a.

The landing gear systems 110 according to the present disclosure provide various benefits and advantages. The landing gear systems 110 may be used with both round parachutes and parafoils, as the landing support assemblies 122 are capable of absorbing or dissipating both vertical and horizontal forces. The deployed state of the landing support assemblies also allows for an uninhibited 180 degree field of regard for sensor packages. The field of regard refers to the angles of unobstructed view provided to an attached payload by the flight vehicle 100. This can allow for uninterrupted data collection. Additionally, the landing support assemblies 122 described herein are reusable (optionally with the exception of the compressible material 183 that may be replaced after use).

Various modifications to the implementations described in this disclosure will be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "example" is used exclusively herein to mean "serving as an example, instance, or illustration." Any implementation described herein as "example" is not necessarily to be construed as preferred or advantageous over other implementations, unless otherwise stated.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Additionally, other implementations are within the scope of the following claims. In some cases, the actions recited in the claims may be performed in a different order and still achieve desirable results.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A deployable landing gear system comprising:
   a payload support configured to support a payload; and
   at least one landing support assembly coupled to the payload support, the at least one landing support assembly configured to deploy to transition from an undeployed state to a deployed state, the at least one landing support assembly comprising:
      a strut comprising:
         a hollow outer cylinder having a compressible material positioned therein;
         an inner cylinder slidably disposed within the hollow outer cylinder;
         a compression spring positioned around the hollow outer cylinder between a first bracket fixed to the hollow outer cylinder and a second bracket slidably disposed over the hollow outer cylinder, wherein, in response to deployment of the at least one landing support assembly, the compression spring is configured to compress between the first bracket and the second bracket, and wherein the inner cylinder is configured to compress the compressible material in response to a vertical force acting on the at least one landing support assembly; and two swing arms, each coupled at a first end to the payload support and at a second end to a common vertex, the two swing arms sharing a common axis of rotation that is offset from an axis of rotation of the strut.

2. The deployable landing gear system of claim 1, further comprising a retaining mechanism configured to assist in holding the at least one landing support assembly in the undeployed state.

3. The deployable landing gear system of claim 2, further comprising a pyro-cutter configured to deploy the at least one landing support assembly by cutting a cable of the retaining mechanism.

4. The deployable landing gear system of claim 1, further comprising a kick-off spring configured to apply an outward force to the strut to assist in deploying the at least one landing support assembly.

5. The deployable landing gear system of claim 1, wherein the at least one landing support assembly further comprises a landing ski, the landing ski coupled to an end of the strut and two swing arms.

6. The deployable landing gear system of claim 1, wherein the strut comprises a first portion and a second portion, the first portion coupled to the second portion via a locking mechanism wherein the locking mechanism is configured to lock the strut in the deployed state after deployment.

7. The deployable landing gear system of claim 1, wherein the compressible material is a honeycomb aluminum.

8. The deployable landing gear system of claim 1, wherein the strut further comprises a third bracket fixed to the inner cylinder and a tension line extending from the third bracket to the second bracket, the tension line configured to assist with movement of the inner cylinder.

9. The deployable landing gear system of claim 1, wherein a position of the second bracket is fixed relative to the inner cylinder.

10. The deployable landing gear system of claim 1, wherein the inner cylinder is configured to translate outwardly and away from the hollow outer cylinder to an extended state in response to deployment of the at least one landing support assembly.

11. The deployable landing gear system of claim 10, wherein the inner cylinder is configured to translate towards and into the hollow outer cylinder to a retracted state in response to the vertical force acting on the at least one landing support assembly.

* * * * *